United States Patent
Lee et al.

(10) Patent No.: US 8,994,248 B2
(45) Date of Patent: Mar. 31, 2015

(54) PROXIMITY SENSOR USED BY AN OPERATION ROBOT AND METHOD OF OPERATING THE PROXIMITY SENSOR

(75) Inventors: Hyung Kew Lee, Gunpo-Si (KR); Joon Ah Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 600 days.

(21) Appl. No.: 13/313,325

(22) Filed: Dec. 7, 2011

(65) Prior Publication Data
US 2012/0147708 A1    Jun. 14, 2012

(30) Foreign Application Priority Data
Dec. 8, 2010    (KR) .................. 10-2010-0124852

(51) Int. Cl.
- *H01L 41/09* (2006.01)
- *G01S 15/04* (2006.01)
- *G01S 7/521* (2006.01)

(52) U.S. Cl.
CPC *G01S 15/04* (2013.01); *G01S 7/521* (2013.01)
USPC ....... 310/338; 310/323.01; 310/322; 310/328

(58) Field of Classification Search
USPC ............... 310/323.01–323.19, 322, 328, 334, 310/338, 367, 369, 371
See application file for complete search history.

(56) References Cited

U.S. PATENT DOCUMENTS

| | | | | |
|---|---|---|---|---|
| 2,702,691 A | * | 2/1955 | Virmani | 366/127 |
| 3,150,592 A | * | 9/1964 | Stec | 417/322 |
| 3,339,666 A | * | 9/1967 | McDonald | 367/28 |
| 4,494,548 A | * | 1/1985 | Buon et al. | 600/446 |
| 4,516,112 A | * | 5/1985 | Chen | 341/34 |
| 4,720,130 A | * | 1/1988 | Andou | 414/749.3 |
| 4,932,003 A | * | 6/1990 | Winbow et al. | 367/75 |
| 5,357,486 A | * | 10/1994 | Pearce | 367/159 |
| 5,515,341 A | * | 5/1996 | Toda et al. | 367/140 |
| 6,296,635 B1 | * | 10/2001 | Smith et al. | 606/19 |

FOREIGN PATENT DOCUMENTS

| | | |
|---|---|---|
| JP | 2008-228810 | 10/2008 |
| JP | 2009-264872 | 11/2009 |
| KR | 10-2009-0029486 | 3/2009 |
| KR | 10-2010-0088400 | 8/2010 |

\* cited by examiner

*Primary Examiner* — Thomas Dougherty
(74) *Attorney, Agent, or Firm* — NSIP Law

(57) ABSTRACT

Described is a proximity sensor used by an operation robot that may measure a proximity distance to an object using an ultrasonic wave in a device such as an operation robot, an endoscope, and the like, and a method of operating the proximity sensor which may be used by an operation robot. The proximity sensor used by the operation robot may include an inner wall provided in a circular structure to secure a cavity within the circular structure, a piezoelectric polymer film disposed outside the inner wall to generate an ultrasonic signal, and to sense the ultrasonic signal, and an outer wall disposed outside the piezoelectric polymer film to propagate the ultrasonic signal via an open window, thereby preventing a collision between devices or an unnecessary contact, and providing a more stable operation environment.

19 Claims, 5 Drawing Sheets

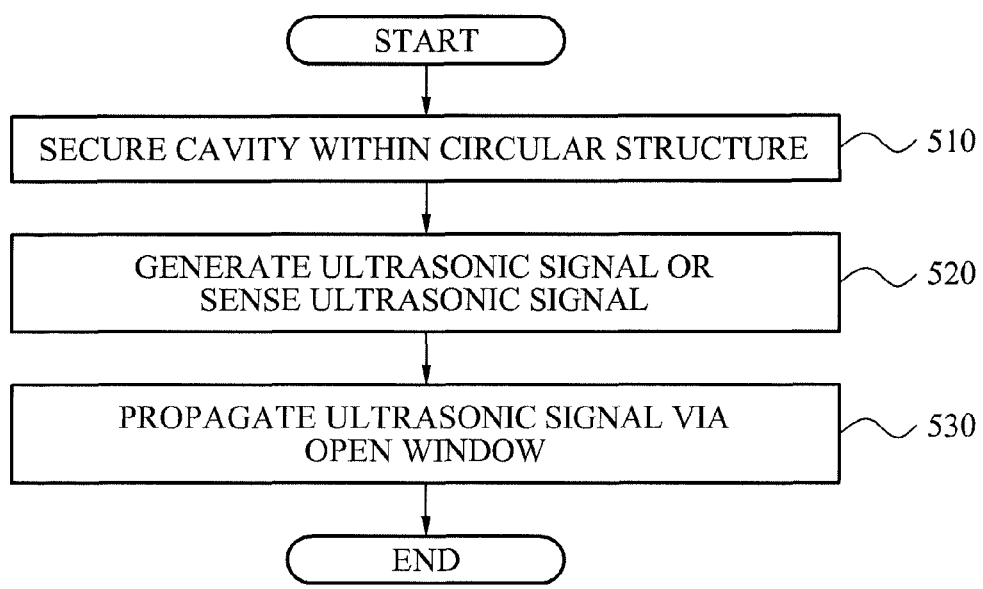

PROXIMITY SENSOR USED BY AN OPERATION ROBOT AND METHOD OF OPERATING THE PROXIMITY SENSOR

CROSS-REFERENCE TO RELATED APPLICATIONS

This application claims the priority benefit of Korean Patent Application No. 10-2010-0124852, filed on Dec. 8, 2010, in the Korean Intellectual Property Office, the disclosure of which is incorporated herein by reference.

BACKGROUND

1. Field

Example embodiments relate to a technology that may be applied to a medical device, for example, an operation robot, an endoscope, and the like, being put into a human or animal body or other enclosures or spaces in which an operation robot or endoscope, and the like may be utilized.

2. Description of the Related Art

Currently, an operation robot may be employed based on a master-slave scheme. For example, when a doctor manipulates a master robot, the master robot may generate a control signal and transfer the control signal to a slave robot. The slave robot may operate according to the control signal to perform an operation on a patient. While viewing the inside of a human body displayed on a screen of the master robot, the doctor may perform an operation by manipulating an operation instrument of the slave robot via a controller.

The slave robot (hereinafter, an operation robot) may insert a separate camera into the inside of the human body to transfer, to the doctor, a visual field with respect to the motion of the operation instrument. However, since the visual field of the camera is limited and the camera does not readily move, instruments of the operation robot may collide with each other or may unnecessarily contact with an unintended portion of the human body, causing an injury.

Accordingly, there is a desire for an additional sensor system that may provide a doctor with proximity information of an instrument of an operation robot with respect to another object such as a human body and the like, in addition to the visual field.

SUMMARY

The foregoing and/or other aspects are achieved by providing a proximity sensor used by an operation robot, including: an inner wall being provided in a circular structure to secure a cavity within the circular structure; a piezoelectric polymer film being disposed outside the inner wall to generate an ultrasonic signal, and to sense the ultrasonic signal; and an outer wall being disposed outside the piezoelectric polymer film to propagate the ultrasonic signal via one or more open windows.

The proximity sensor may further include a pillar being fixed between the inner wall and the piezoelectric polymer film to form the cavity, and to closely attach or secure the piezoelectric polymer film to the outer wall.

The piezoelectric polymer film may include a generator to generate the ultrasonic signal using an alternating current (AC) circuit; and a receiver to sense the ultrasonic signal using an AC signal sensing circuit.

The piezoelectric polymer film may be coated with an internal electrode corresponding to the inner wall and an external electrode corresponding to the outer wall to receive a voltage via the internal electrode and the external electrode.

The external electrode may be connected to a generator to generate the ultrasonic signal, and to a receiver to sense the ultrasonic signal. The internal electrode may be separated into a first internal wire and a second internal wire. The first internal wire may be connected to an AC circuit, and the second internal wire may be connected to an AC signal sensing circuit.

The outer wall may coat the open window with an insulating layer to protect the piezoelectric polymer film.

The foregoing and/or other aspects are achieved by providing a method of operating a proximity sensor used by an operation robot, including: securing a cavity within a circular structure, using an inner wall that is provided in the circular structure; generating an ultrasonic signal and sensing the ultrasonic signal at a piezoelectric polymer film disposed outside the inner wall; and propagating the ultrasonic signal via one or more open windows, using an outer wall disposed outside the piezoelectric polymer film.

According to example embodiments, it is possible to prevent a collision between instruments of an operation robot or an unnecessary contact with a human or animal body by measuring a proximity distance between an instrument of the operation robot and the human or animal body using an ultrasonic signal generated at a piezoelectric polymer film.

According to example embodiments, it is possible to readily measure a proximity distance between a proximity sensor and a human or animal body by generating an ultrasonic signal through a connection between a piezoelectric polymer film and an AC circuit, and by sensing the ultrasonic signal through a connection between the piezoelectric polymer film and an AC signal sensing circuit.

According to example embodiments, it is possible to construct a stable operation environment using a proximity distance between an instrument of an operation robot and a human or animal body.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 5 illustrates a method of operating the proximity sensor for the operation robot of FIG. 1 according to example embodiments.

DETAILED DESCRIPTION

Figure 1:
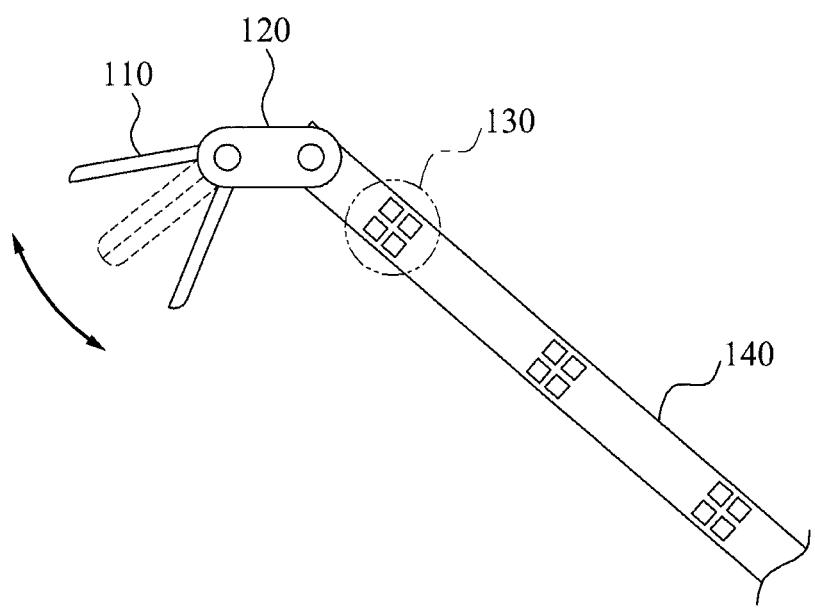
FIG. 1 illustrates a proximity sensor for an operation robot applied to an instrument of the operation robot according to example embodiments.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates a proximity sensor 130 which may be used by an operation robot applied to an instrument of the operation robot according to example embodiments.

In general, the operation robot may include a master robot and a slave robot. For example, while viewing the inside of a human or animal body displayed on a screen of the master robot, a doctor may perform an operation by manipulating an operation instrument of the slave robot via a controller.

Referring to FIG. 1, an operation instrument 100 of the slave robot is designed to move with multiple degrees of freedom (DoFs) based on an instrument 110 and a joint 120. The instrument 110 may be provided in various types of shapes depending on, for example, the intended use of the instrument. The instrument 110 and the joint 120 may be connected to the slave robot which may be placed outside a human or animal body via an extended robot arm 140. For collision prevention, a plurality of proximity sensors 130 may be installed in the robot arm 140. The proximity sensor 130 may calculate a distance between an outer wall of the robot arm 140 and another object, for example, an organ within a human or animal body, based on a time difference between a time when an ultrasonic signal occurs, and a time when the ultrasonic signal is sensed.

Figure 2:
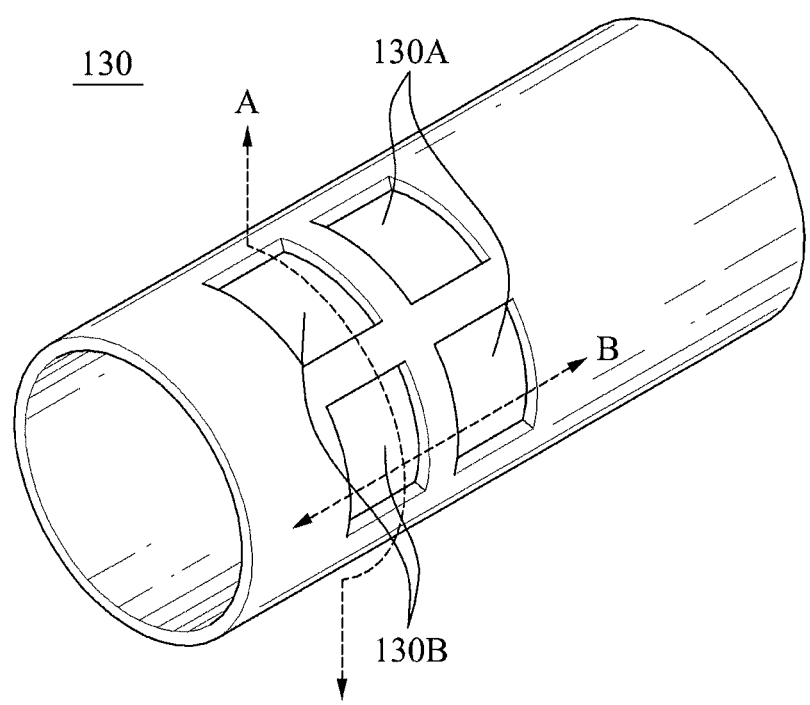
FIG. 2 illustrates a perspective view of the proximity sensor for the operation robot of FIG. 1.

FIG. 2 illustrates a perspective view of the proximity sensor 130 which may be used by the operation robot of FIG. 1.

Referring to FIG. 2, the proximity sensor 130 which may be used by the operation robot may include an inner wall being provided in a circular structure to secure a cavity within the circular structure, a piezoelectric polymer film being disposed outside the inner wall to generate an ultrasonic signal, and to sense the ultrasonic signal, and an outer wall being disposed outside the piezoelectric polymer film to propagate the ultrasonic signal via an open window.

The proximity sensor 130 may further include a pillar being fixed between the inner wall and the piezoelectric polymer film to form the cavity, and to closely attach or secure the piezoelectric polymer film to the outer wall.

The piezoelectric polymer film may include a generator 130A to generate the ultrasonic signal and a receiver 130B to sense the ultrasonic signal.

Figure 3:
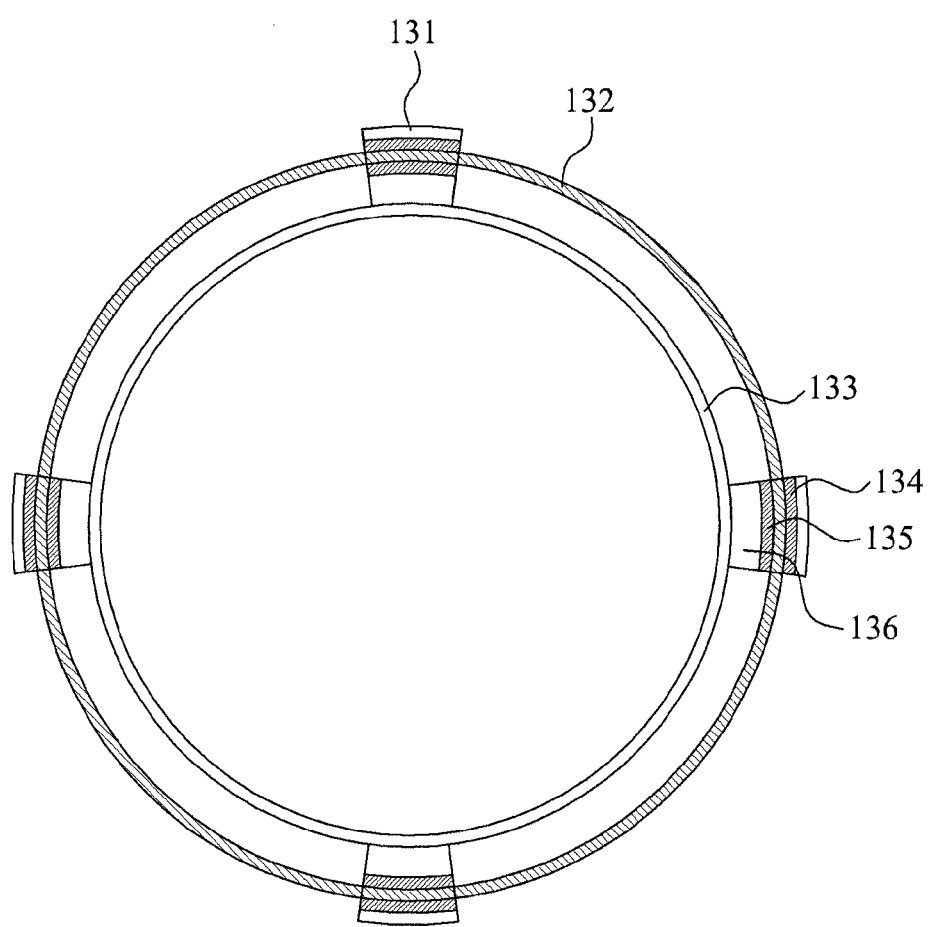
FIG. 3 illustrates a cross-sectional view of the proximity sensor for the operation robot cut along a direction A of FIG. 2.

FIG. 3 illustrates a cross-sectional view of the proximity sensor 130 which may be used by the operation robot cut along a direction A of FIG. 2.

Referring to FIG. 3, the proximity sensor 130 which may be used by the operation robot may include an outer wall 131, a piezoelectric polymer film 132, an inner wall 133, an external wire 134, an internal wire 135, and a pillar 136.

The inner wall 133 may be provided in a circular structure to secure a cavity within the circular structure. An inside of the circular structure may include an instrument used to perform an operation, an endoscope, and the like. The proximity sensor 130 may be formed on a 'surface' surrounding the instrument used to perform the operation and the endoscope. As shown in FIG. 2 and FIG. 3, the structure described is formed in a circular shape. However, it is only an example and thus, the structure may be provided in various types of shapes (e.g., elliptical, triangular, polygonal, etc.), depending on, for example, the type of operation performed or the intended use of the operation instrument.

The piezoelectric polymer film 132 may be disposed outside the inner wall 133 to generate an ultrasonic signal or to sense the ultrasonic signal. For example, when an alternating current (AC) voltage is applied to the piezoelectric polymer film 132, the piezoelectric polymer film 132 may generate the ultrasonic signal by repeating a contraction and a relaxation.

When the ultrasonic signal is received at the piezoelectric polymer film 132, the piezoelectric polymer film 132 may be contracted or relaxed due to the ultrasonic signal, thereby generating an AC signal and sensing the ultrasonic signal.

Accordingly, when an AC circuit is connected to the piezoelectric polymer film 132, the piezoelectric polymer film 132 may be employed as the generator 130A to generate the ultrasonic signal. When an AC signal sensing circuit is connected to the piezoelectric polymer film 132, the piezoelectric polymer film 132 may be employed as the receiver 130B to sense the ultrasonic signal.

For example, the single piezoelectric polymer film 132 may be employed to perform as both the generator 130A and the receiver 130B. The piezoelectric polymer film 132 may be formed of, for example, polyvinylidene fluoride (PVDF).

The pillar 136 may closely attach or secure the piezoelectric polymer film 132 to the outer wall 131, and may form the cavity between the piezoelectric polymer film 132 and the inner wall 133. Accordingly, when the AC current is applied, the pillar 136 may maximize a vibration of the piezoelectric polymer film 132.

The outer wall 131 may include an open window to smoothly propagate the ultrasonic signal. A shape of the open window may define the proximity sensor 130, for example, the generator 130A and the receiver 130B. As shown in FIG. 2, the open window may be formed in a rectangular shape. However, it is only an example and thus, the open window may be provided in various types of shapes (e.g., circular, elliptical, triangular, polygonal, etc.), to maximize the generation efficiency of the ultrasonic signal.

The outer wall 131 may protect the piezoelectric polymer film 132 by coating a thin insulating layer on a portion where an external electrode of the piezoelectric polymer film 132 is externally exposed via the open window. The outer wall 131 may be formed to correspond to the pillar 136, and may efficiently propagate the ultrasonic signal to an outside by coating the insulating layer on the portion including the generator 130A and the receiver 130B of the piezoelectric polymer film 132.

Figure 4:
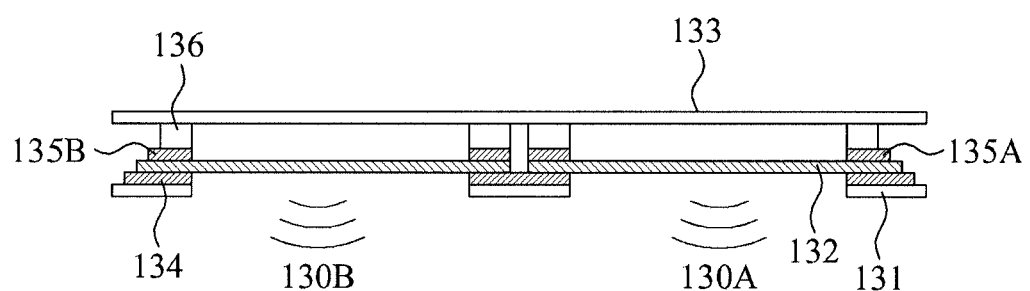
FIG. 4 illustrates a cross-sectional view of the proximity sensor for the operation robot cut along a direction B of FIG. 2.

FIG. 4 illustrates a cross-sectional view of the proximity sensor 130 which may be used by the operation robot cut along a direction B of FIG. 2.

Constituent elements of FIG. 4 will be the same as the constituent elements of FIG. 3.

Electrodes for applying a voltage may be coated on both sides of the piezoelectric polymer film 132. For example, the internal electrode corresponding to the inner wall 133 and the external electrode corresponding to the outer wall 131 may be coated on the piezoelectric polymer film 132. The piezoelectric polymer film 132 may receive the voltage via the internal electrode and the external electrode.

The external electrode may be in direct contact with the external wire 134. For example, the external electrode may be connected to the generator 130A and the receiver 130B via the external wire.

The internal electrode may be connected to the internal wire 135. The internal wire 135 may be separated into a first internal wire 135A and a second internal wire 135B. For example, the first internal wire 135A may be connected to the AC circuit, and the second internal wire 135B may be connected to the AC signal sensing circuit.

The external wire 134 and the internal wire 135 may be connected to each other via an electric wire of an operation robot system using an empty space between the outer wall 131 and the internal wall 133.

As described above, when the AC voltage is applied to the AC circuit, the piezoelectric polymer film 132 may generate the ultrasonic signal via the open window, and the outer wall 131 may propagate the ultrasonic signal to the air. The propagated ultrasonic signal may be reflected from the surface of another robot or the human or animal body and a portion of the reflected ultrasonic signal may be sensed at the receiver 130B. The proximity sensor 130 which may be used by the operation robot may calculate a distance between the outer wall 131 of the robot arm 140 and another object based on a time difference between a time when the ultrasonic signal occurs and a time when the ultrasonic signal is sensed.

FIG. 5 illustrates a method of operating the proximity sensor 130 which may be used by the operation robot of FIG. 1 according to example embodiments.

In operation 510, the proximity sensor 130 which may be used by the operation robot may secure a cavity within a circular structure in the inner wall 133 provided in the circular structure. An inside of the circular structure may include an instrument to perform an operation, an endoscope, and the like. For example, the inner wall 133 may be formed on a 'surface' surrounding a portion including the instrument for the operation and the endoscope in the circular structure.

In operation 520, the proximity sensor 130 may generate an ultrasonic signal at the piezoelectric polymer film 132 disposed outside the inner wall 133, or may sense the ultrasonic signal. The piezoelectric polymer film 132 may include the generator 130A to generate the ultrasonic signal using an AC circuit and the receiver 130B to sense the ultrasonic signal using the AC signal sensing circuit.

For example, when an AC voltage is applied to the AC circuit, the piezoelectric polymer film 132 may generate the ultrasonic signal by repeating a contraction and a relaxation.

When the ultrasonic signal is received at the piezoelectric polymer film 132, the piezoelectric polymer film 132 may be contracted or relaxed due to the ultrasonic signal, thereby generating an AC signal and sensing the ultrasonic signal.

In operation 530, the proximity sensor 130 may propagate the ultrasonic signal via an open window using the outer wall 131 disposed outside the piezoelectric polymer film 132.

To effectively transfer the ultrasonic signal, the outer wall 131 may propagate the ultrasonic signal via the open window. The outer wall 131 may protect the piezoelectric polymer film 132 by coating the open window with an insulating layer.

The pillar 136 may be fixed to form a cavity between the inner wall 133 and the piezoelectric polymer film 132, and may closely attach or secure the piezoelectric polymer film 132 to the outer wall 131.

According to an embodiment, the piezoelectric polymer film 132 may be coated with electrodes, for example, an internal electrode and an external electrode to apply a voltage to both surfaces. For example, the piezoelectric polymer film 132 may be coated with the internal electrode corresponding to the inner wall 133 and the external electrode corresponding to the outer wall 131. The external electrode may directly contact the external wire 134, and be connected to the generator 130A and the receiver 130B via the external wire. The internal electrode may be connected to the internal wire 135. The internal wire 135 may be separated into the first internal wire 135A and the second internal wire 135B. The first internal wire 135A may be connected to the AC circuit, and the second internal wire 135B may be connected to the AC signal sensing unit.

Proximity sensors which may be used by an operation robot and/or controllers according to example embodiments may be embodied using various types of packages. For example, the proximity sensors and/or controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Quad Flatpack (QFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

While the disclosure herein has provided example embodiments of a proximity sensor which may be used by an operation robot, for example, in a medical setting to perform an operation on a human or animal body, the disclosure is not so limited. For example, a proximity sensor used by an operation robot may be used in other settings which may benefit from the proximity sensor disclosed herein. For example, the proximity sensor may be utilized in any confined space or enclosure in which the proximity sensor may provide proximity information to a user or system, so as to avoid collisions between bodies or objects, or to prevent injuries to bodies or objects, that may be located or disposed within the space or enclosure. Possible settings may include, for example, mining operations, surveillance operations, inspection operations, repair operations, bomb disposal operations, etc., however again, the disclosure is not so limited.

Accordingly, although example embodiments have been shown and described, it would be appreciated by those skilled in the art that changes may be made in these embodiments without departing from the principles and spirit of the disclosure, the scope of which is defined by the claims and their equivalents.

What is claimed is:

1. A proximity sensor used by an operation robot, comprising:
    an inner wall provided in a structure to secure a cavity within the structure;
    a piezoelectric polymer film disposed outside the inner wall to generate an ultrasonic signal, and to sense the ultrasonic signal;
    an internal wire disposed between the inner wall and the piezoelectric polymer film;
    a pillar which extends from the inner wall to the internal wire to space apart the piezoelectric polymer film from the inner wall; and
    an outer wall disposed outside the piezoelectric polymer film to propagate the ultrasonic signal via one or more open windows disposed in the outer wall.

2. The proximity sensor of claim 1,
    wherein the pillar secures the piezoelectric polymer film to the outer wall.

3. The proximity sensor of claim 1, wherein the piezoelectric polymer film comprises:
    a generator to generate the ultrasonic signal using an alternating current (AC) circuit; and
    a receiver to sense the ultrasonic signal using an AC signal sensing circuit.

4. The proximity sensor of claim 1, wherein the piezoelectric polymer film is coated with an internal electrode corresponding to the inner wall and an external electrode corresponding to the outer wall and receives a voltage via the internal electrode and the external electrode.

5. The proximity sensor of claim 4, wherein the piezoelectric polymer film comprises:
a generator to generate the ultrasonic signal; and
a receiver to sense the ultrasonic signal,
wherein the external electrode is connected to the generator, and
the internal electrode is separated into a first internal wire connected to an AC circuit and a second internal wire connected to an AC signal sensing circuit.

6. The proximity sensor of claim 4, wherein the external electrode is connected to an external wire disposed between the outer wall and the piezoelectric polymer film, and the internal electrode is connected to the internal wire disposed between the inner wall and the piezoelectric polymer film.

7. The proximity sensor of claim 1, wherein the one or more open windows are coated with an insulating layer to protect the piezoelectric polymer film.

8. A method of operating a proximity sensor used by an operation robot, comprising:
securing a cavity within a structure, using an inner wall that is provided in the structure;
generating an ultrasonic signal and sensing the ultrasonic signal at a piezoelectric polymer film disposed outside the inner wall;
forming a fixing pillar to space apart the piezoelectric polymer film from the inner wall and an internal wire disposed between the inner wall and the piezoelectric polymer film; and
propagating the ultrasonic signal via one or more open windows, using an outer wall disposed outside the piezoelectric polymer film.

9. The method of claim 8, further comprising:
attaching the piezoelectric polymer film to the outer wall using the fixing pillar.

10. The method of claim 8, wherein the sensing of the ultrasonic signal comprises:
generating, at the piezoelectric polymer film, the ultrasonic signal using an alternating current (AC) circuit; and
sensing, at the piezoelectric polymer film, the ultrasonic signal using an AC signal sensing circuit.

11. The method of claim 8, further comprising:
coating the piezoelectric polymer film with an internal electrode corresponding to the inner wall and an external electrode corresponding to the outer wall; and
receiving, at the piezoelectric polymer film, a voltage via the internal electrode and the external electrode.

12. The method of claim 11, further comprising:
connecting the external electrode to a generator which generates the ultrasonic signal and to a receiver which senses the ultrasonic signal.

13. The method of claim 11, further comprising:
separating the internal electrode into a first internal wire and a second internal wire;
connecting the first internal wire to an AC circuit; and
connecting the second internal wire to an AC signal sensing circuit.

14. The method of claim 8, further comprising:
protecting the piezoelectric polymer film by coating, using an insulating layer, the one or more open windows included in the outer wall.

15. The method of claim 11, further comprising:
connecting the external electrode to an external wire disposed between the outer wall and the piezoelectric polymer film;
connecting the internal electrode to the internal wire disposed between the inner wall and the piezoelectric polymer film.

16. A proximity sensor system comprising:
a joint connected to an instrument to provide the instrument with multiple degrees of freedom to perform an operation;
an arm connected to the instrument and joint; and
one or more proximity sensors installed on the arm to sense an object,
wherein the one or proximity sensors further comprise:
an inner wall provided in a structure to secure a cavity within the structure;
a piezoelectric polymer film disposed outside the inner wall to generate an ultrasonic signal, and to sense the ultrasonic signal;
an internal wire disposed between the inner wall and the piezoelectric polymer film;
a pillar which extends from the inner wall to the internal wire to space apart the piezoelectric polymer film from the inner wall; and
an outer wall disposed outside the piezoelectric polymer film to propagate the ultrasonic signal via one or more open windows disposed in the outer wall.

17. The proximity sensor of claim 1, wherein,
the inner wall is a substantially cylindrical body, the cavity is disposed within the cylindrical body, and an instrument of the operation robot is included in the cavity.

18. The proximity sensor of claim 1, wherein:
the piezoelectric polymer film is coated with an internal electrode on a side of the piezoelectric polymer film which is adjacent to the internal wire, and is coated with an external electrode on another side of the piezoelectric polymer film which is adjacent to an external wire which is disposed between the outer wall and the piezoelectric polymer film.

19. The proximity sensor of claim 1, wherein:
the internal wire comprises a first internal wire and a second internal wire, the second internal wire being separated from the first internal wire,
a first portion of the piezoelectric polymer film generates an ultrasonic signal when a voltage is applied via the first internal wire to a first internal electrode coated on a side of the first portion of the piezoelectric polymer film which is adjacent to the first internal wire, and
a second portion of the piezoelectric polymer film senses the generated ultrasonic signal which is reflected from an object, using a signal sensing circuit which is connected to the second internal wire.

* * * * *